Jan. 29, 1963 G. F. N. OLIVER ETAL 3,076,108
VIBRATORY ELECTRIC MOTOR
Filed May 20, 1958
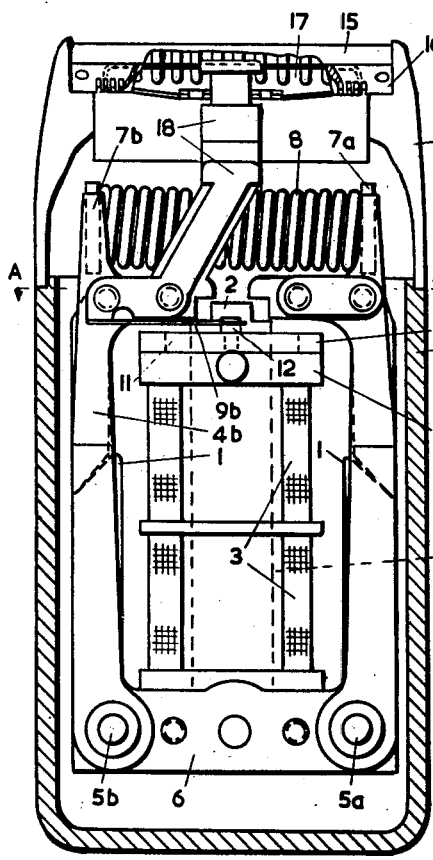
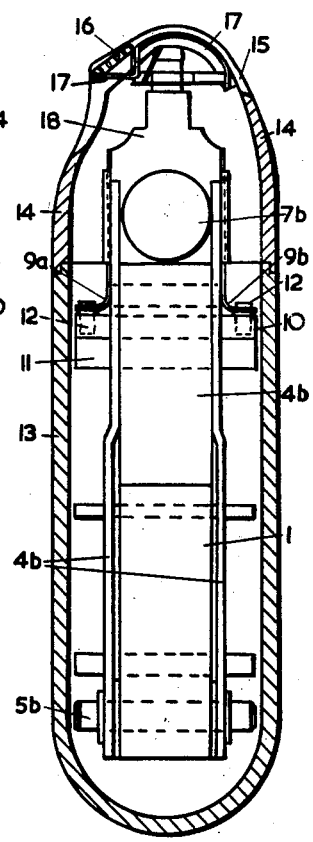
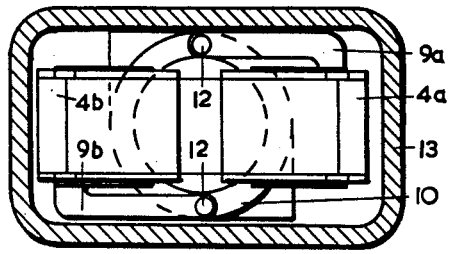
INVENTORS
GEORGE FRANCIS NORRIS OLIVER
JAMES ERIC APTED
BY Hane and Nydith
ATTORNEYS

United States Patent Office 3,076,108
Patented Jan. 29, 1963

3,076,108
VIBRATORY ELECTRIC MOTOR
George Francis Norris Oliver, Bean, near Dartford, and James Eric Apted, Blackheath, London, England, assignors to Oliver Pell Control Limited, London, England
Filed May 20, 1958, Ser. No. 736,576
8 Claims. (Cl. 310—29)

Small electro magnetically operated sources of mechanical power are known wherein a reciprocating motion is obtained by the attraction and/or repulsion of a spring returned armature, which may either be operated synchronously from a source of alternating current, or operated by an interrupted source of direct current. Such vibratory electric motors usually comprise a coil energised magnetic member known as the stator unit and a moving member known as the armature which is pivoted to, spring mounted on, or otherwise hingedly connected to the stator.

Since it is impracticable to provide effective balancing of the mass of a single armature operated in the manner described, there is considerable energy lost, due to the unbalanced reactions of the armature being transferred to the frame, or fixed portion of the system, where it is dissipated in vibration which is frequently objectionable; whilst there is a resultant reduction in the mechanical output energy available at a driving point attached to or energised from the moving armature. This is more particularly the case in devices operating at their natural frequency and powered by alternating current, when the inertia forces of the vibrating armature usually much exceed the forces available for transmission as mechanical power.

The present invention includes a vibratory electric motor comprising a coil energised stator unit, two opposed and similar armatures hingedly connected to said stator unit for movement towards and away from each other under the influence of intermittent magnetic forces produced by said stator unit and a restoring force, and a mechanical coupling connecting the two armatures so as to keep their motions substantially equal and opposite at all times.

The arrangement according to the invention ensures that the two armatures remain in synchronism to avoid the production of unbalanced inertia reaction, allows the mechanical power available from the movement of both armatures to be taken from a common drive point, and allows the restoring force to be provided by a single spring engaged between the two armatures.

Vibratory electric motors in accordance with the invention may be employed in devices of many different kinds but they are particularly suitable for use in dry shavers and other small hand held devices.

One preferred construction of dry shaver embodying a vibratory electric motor according to the invention will now be described in detail by way of example only, reference being made to the accompanying drawings in which:

FIGURE 1 is a sectional side elevational view of the dry shaver;
FIGURE 2 is a sectional end elevational view thereof;
FIGURE 3 is a sectional plan view thereof taken on the line A—A of FIGURE 1.

Referring to the drawings, a stator unit for the vibratory electric motor comprises a substantially E-shaped member constructed of laminations of magnetic material and including a pair of side limbs 1, a central core 2 and a base portion 6. Disposed around core 2 are a pair of coils 3 (FIGURE 1) for receiving an intermittent direct current or alternating current supply so as to cause intermittent equal and opposite magnetic forces to be applied to two armatures 4a and 4b.

Each of the armatures extends between the end of one of the side limbs 1 and the end of the central core 2 and includes a pair of side plates or cheeks which extend on opposite sides of the corresponding side limb 1, engage a pivot pin by which the armature is supported. The two pivot pins 5a and 5b are mounted in said E-shaped member, one at either side of the base portion 6 thereof. The armatures are thus disposed on opposite sides of the stator unit with the major part of the mass of each armature disposed close to its free end, adjacent the extremity of the stator unit opposite said pivot pins. Projections 7a and 7b on the free ends of the armatures engage the opposite ends of a common helical spring 8. It will be appreciated that under the influence of the intermittent magnetic field produced by the stator unit and the restoring force of the spring, the armatures will be caused to vibrate towards and away from each other, their free ends moving across the end face of the core 2.

A pair of symmetrically disposed projections 9a and 9b on the armatures pass on opposite sides of the stator unit and are coupled to opposite ends of a coupler or balance member mounted on the stator unit, the arrangement being such that the movements of the armatures are constrained by the action of the coupler member to be at all times equal and opposite with respect to the stator unit. The coupler member is preferably mounted for oscillating movement in a plane perpendicular to that in which the armatures move, and may be a simple two armed lever centrally pivoted to the stator, but conveniently and as shown in the drawings, it takes the form of a ring 10 encircling and supported on a boss 11 of substantial diameter which is secured around the core 2 of the stator unit. The ring 10 is coupled to the projections 9a and 9b by pins 12, riveted to the projection on the armatures and engaging pivotally in apertures formed in the ring on opposite sides thereof. The ring 10 is preferably constructed of low friction non-conducting material such as nylon, thus reducing or eliminating eddy currents which might otherwise be induced in the ring.

The vibratory electric motor is shown mounted within a moulded casing 13 of the dry shaver, the casing being shown in diagrammatic form only, and a detachable head 14 incorporating an outer stationary foil cutter 15 and clipper bar 16 is shown in position on the casing. A movable inner cutter 17 is connected by means 18 to the armature 4b so as to be reciprocably driven thereby. The means for mounting and driving the inner cutter are not described in detail, since they do not form any part of the present invention.

In an alternative arrangement (not shown) a stator unit is provided such that it causes intermittent equal and opposite magnetic forces to be applied to two armatures which are supported and guided for movement in fixed paths relative to the stator by flat strip springs, fixed at one end to the armatures, or suitable extensions of them and at the other end to that part of the stator assembly farthest distant from the mass of the armatures. In this construction two trident shaped springs are used, one at either side of the complete assembly, the central blade of each spring having a width double that of the outer blades. Each armature is fixed to the two outer blades of the spring at one side and to the central blade of the spring at the other side. The armature masses move towards or away from each other under the influence of the intermittent magnetic force and the restoring force of their supporting springs. The armatures are interconnected through a coupler member, as described in connection with the construction illustrated so that the motions of the armatures are equal and opposite with respect to the stator unit and the inertia reaction forces at the anchorage point of the trident supporting springs are also substantially equal and opposite.

The mechanical output energy of the vibratory electric motor of either of the above constructions may be taken from the movement of one, or of both armatures, or from the movement of their connecting coupler member, whilst ensuring that the motion of the two armatures remains symmetrical relative to the stator unit at all times and thus that these movements produce negligible unbalanced inertia reactions upon the stator unit or its support due to their vibration. Thus the reciprocating inner cutter 17 of a dry shaver may be connected to the coupler member 10, or to one of the armatures 4b as shown (the other armature being suitably loaded substantially to equalise the inertia of the two oppositely moving systems), or two separate cutter members may be respectively connected to the two armatures.

We claim:

1. A vibratory electric motor comprising a stator unit, two opposed and similar armatures hingedly connected to said stator unit for movement towards and away from each other under the influence of the intermittent magnetic forces produced by said stator unit and a restoring force, said stator unit including a substantially E-shaped member of magnetic material having a pair of side limbs and a central core, and an energizing coil encompassing said core, each of said armatures extending between the end of one of said side limbs and the end of said core and each armature being mounted to move across the end face of said core, and a mechanical coupling connecting said two armatures to maintain the motions thereof substantially equal and opposite at all times, said mechanical coupling comprising a coupling ring rotatably mounted on the stator unit for oscillating movement, the armatures being coupled to diametrically opposite points on said ring, said oscillating movement being in a plane perpendicular to that in which said armatures move.

2. A motor according to claim 1 in which said coupler member comprises a two armed lever centrally pivoted to the stator unit, the armatures being coupled one to each arm of said lever.

3. A motor according to claim 1 in which said ring is constructed of low friction non-conducting material.

4. A motor according to claim 1 in which said coupling ring is rotatably mounted on a boss secured to the outer end of said core.

5. A motor according to claim 1 in which said armatures are hingedly connected to said stator unit by means of a pair of pivot pins, one for each armature, said pivot pins being mounted one at either side of the base portion of said E-shaped member.

6. A motor according to claim 1 in which said armatures are supported and guided for movement in fixed paths relative to the stator unit by a pair of flat strip springs fixed at one end to the armatures, and at the other end one to either side of the stator unit and to that part thereof furthest distant from the mass of the armatures, said spring being trident shaped, the central blade of each spring having a width double that of the outer blades, each of said armatures being fixed to the two outer blades of the spring at one side and to the central blade of the spring at the other side.

7. A motor according to claim 6, in which said restoring force is provided by said trident shaped springs.

8. A motor according to claim 1, in which the free ends of the armatures engage the opposite ends of a common helical spring which provides a restoring force.

References Cited in the file of this patent

UNITED STATES PATENTS

| | | |
|---|---|---|
| 1,891,486 | Wahl | Dec. 20, 1932 |
| 2,245,981 | Knopp | June 17, 1941 |
| 2,259,131 | Fleischer et al. | Oct. 14, 1941 |
| 2,434,671 | Murphy | Jan. 20, 1948 |
| 2,741,711 | Meyerin | Apr. 10, 1956 |

FOREIGN PATENTS

| | | |
|---|---|---|
| 1,137,387 | France | Jan. 14, 1957 |